United States Patent [19]

Fraley

[11] Patent Number: 5,228,152
[45] Date of Patent: Jul. 20, 1993

[54] WATER SAVING TOILET AND BATHROOM FIXTURE SYSTEM

[76] Inventor: Florence D. Fraley, 2174 San Pasqual, Pasadena, Calif. 91107

[21] Appl. No.: 854,725

[22] Filed: Mar. 23, 1992

[51] Int. Cl.⁵ .......................... A47K 4/00; E03C 1/01
[52] U.S. Cl. .................................................. 4/664; 4/665
[58] Field of Search ............... 4/664, 665, 663, 420.1, 4/420.2, 415, 445, 324

[56] References Cited

U.S. PATENT DOCUMENTS

| | | | |
|---|---|---|---|
| 1,935,779 | 11/1933 | Kemach | 4/665 |
| 3,015,827 | 1/1962 | Iwata | 4/664 X |
| 3,947,899 | 4/1976 | Robinson et al. | 4/420.2 X |
| 4,163,293 | 8/1979 | Basterfield | 4/664 |
| 4,980,932 | 1/1991 | Stemples | 4/415 |

FOREIGN PATENT DOCUMENTS

| | | | |
|---|---|---|---|
| 0263328 | 10/1989 | Japan | 4/664 |
| 1596987 | 9/1981 | United Kingdom | 4/665 |
| 2097436 | 11/1982 | United Kingdom | 4/664 |

*Primary Examiner*—Henry J. Recla
*Assistant Examiner*—Charles R. Eloshway
*Attorney, Agent, or Firm*—Christie, Parker & Hale

[57] ABSTRACT

A water saving toilet includes a sink mounted to a fixture base above a toilet tank. A drain opening in the bottom of the sink leads directly into the toilet tank, and a domestic water supply shutoff valve in the tank diverts water from the tank and directs it through a water diverting line leading to a spout adjacent the sink. After the toilet is flushed, domestic water preferentially passes from the supply valve through the water diverting line to the spout on the sink so the water will run continuously through the spout and into the sink for use in washing. Recycled water runs from a drain in the sink into the toilet tank to fill the tank for the next flush cycle. The float ball in the tank shuts off the supply valve after the tank fills which also shuts off the supply of water to the spout, so the volume of water diverted through the sink for washing is regulated to the amount for one flush cycle. Water flow diverted through the sink and to the toilet tank can be continuous and uninterrupted, or it can pass through an intervening diverter valve and bypass line for controlling the proportionate amount of water passing to the sink during each flush cycle.

8 Claims, 2 Drawing Sheets

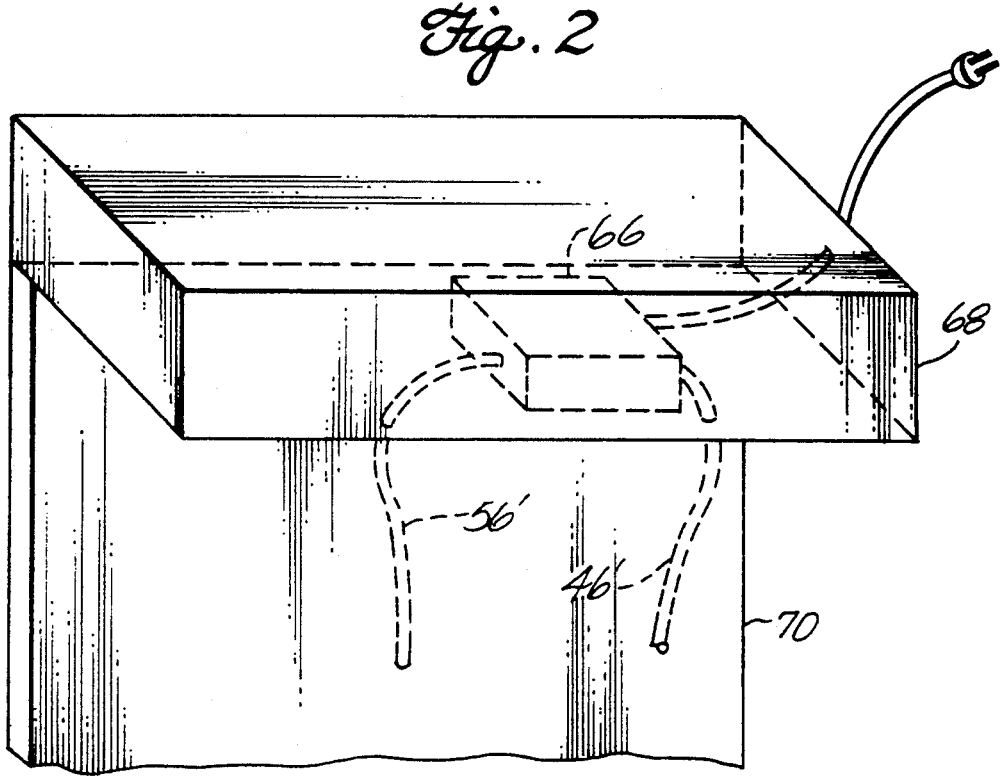
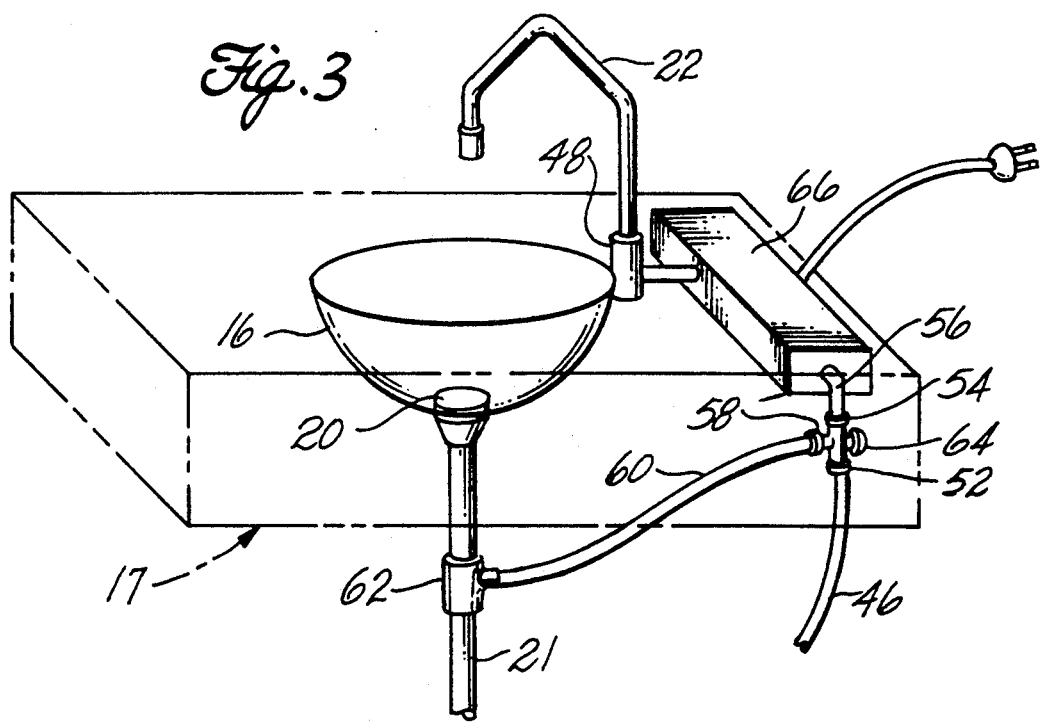

WATER SAVING TOILET AND BATHROOM FIXTURE SYSTEM

FIELD OF THE INVENTION

This invention relates generally to toilets, and more particularly, to a water saving toilet and bathroom fixture system.

BACKGROUND OF THE INVENTION

In recent years serious drought conditions and mandatory water rationing throughout this country have emphasized the critical need for water conservation. The wasteful use of water in the home, and particularly the bathroom, was long ago identified as an area where water conservation in particular can be improved. As a result, there have been numerous approaches to the problem of reducing the volume of water used during each flush cycle of the toilet. For instance, various techniques have been used for displacing the volume of water used to fill the toilet tank. One such system is the Econo-self-flush toilet disclosed in Hendrick U.S. Pat. No. 3,995,327.

In addition to conserving water as much as possible, a water saving toilet system should be reasonably inexpensive and should easily adapt to existing plumbing systems without requiring a major retrofitting expense.

The present invention provides a water saving toilet and bathroom fixture system which saves water and can be adapted into existing toilets or installed as a new system at a reasonable expense.

SUMMARY OF THE INVENTION

The present invention provides a water saving toilet and bathroom fixture system in which a sink is mounted above a toilet tank. The sink has a drain opening at its base leading directly into the toilet tank. A domestic water supply valve in the tank directs water under pressure to a line leading from the valve to a water supply spout mounted above the sink. After the toilet is flushed, domestic water passes from the supply valve through the line and to the spout on the sink so the water can run downwardly into the sink for use in washing. The recycled water then runs directly from the drain in the base of the sink into the toilet tank to fill the tank for the next flush cycle. The float ball or other water level control device in the tank shuts off the supply valve after the tank fills so that the volume of water cycled through the spout and to the sink for washing is regulated to the amount used in one flush cycle of the toilet.

Thus, the amount of water normally used for one flush cycle of the toilet is instead diverted from the toilet tank for use in washing in a sink conveniently located above the toilet. The water is continuously recycled from the sink to the toilet tank for use in filling the tank in the normal manner, thereby saving the additional amount of water normally used in washing. The amount of water used in one flush cycle is more than sufficient for use in washing. In addition to the environmental advantages of saving water, the system can be easily implemented at a reasonable expense. There are no complicated valve systems, water diversion systems, water reservoirs in the toilet tank, or extensive external plumbing necessary to implement the invention.

These and other aspects of the invention will be more fully understood by referring to the following detailed description and the accompanying drawings.

BRIEF DESCRIPTION OF THE DRAWINGS

FIGS. 2 and 3 illustrate alternative embodiments comprising an optional heater for use in a water diversion system.

DETAILED DESCRIPTION

Figure 1:
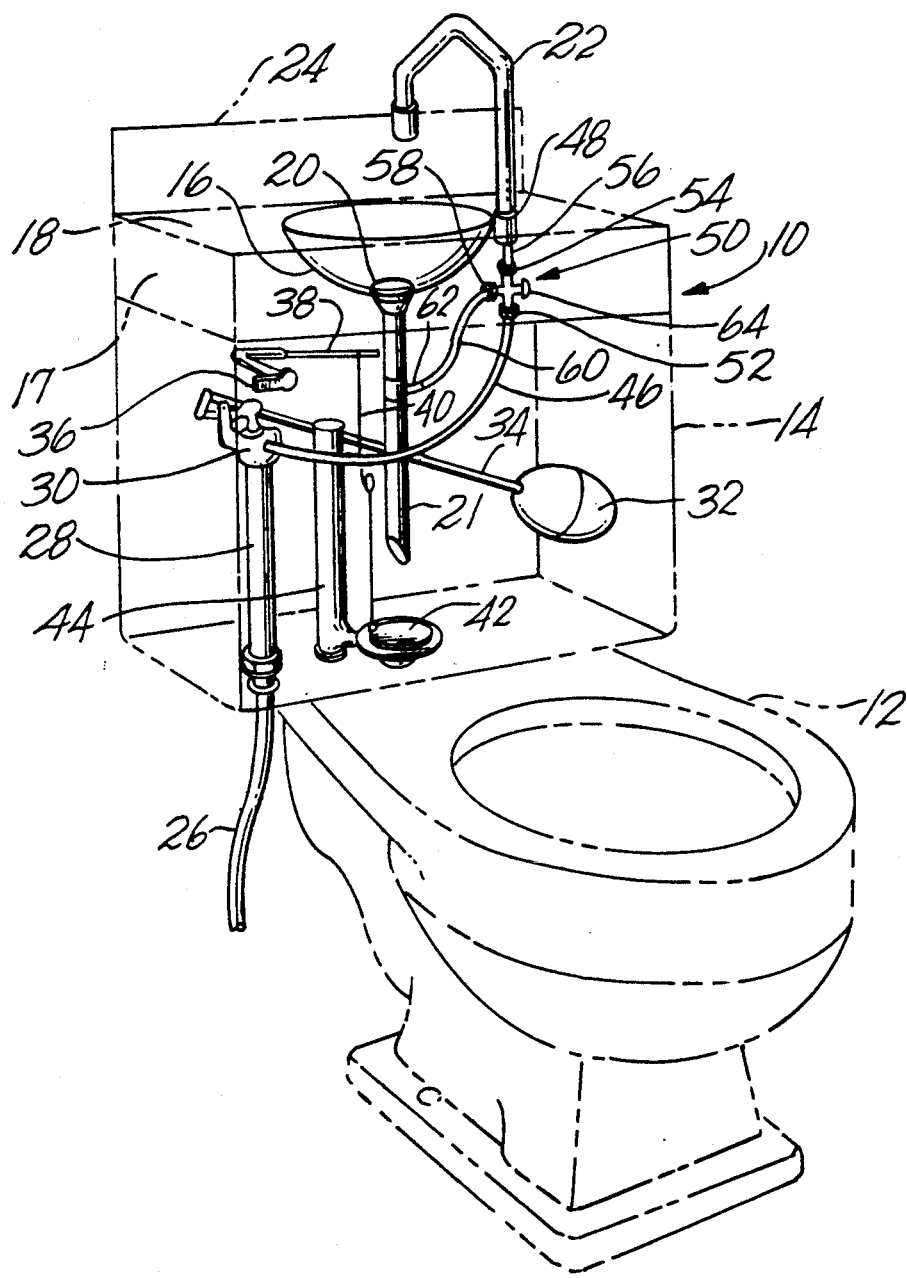
FIG. 1 is a perspective view illustrating components of a water saving toilet and bathroom fixture system of this invention.

FIG. 1 is a perspective view illustrating a toilet and bathroom fixture system 10 according to principles of this invention. The system includes a conventional toilet bowl 12 sealed to the floor in the usual manner and a conventional toilet tank 14 for containing a volume of water used during each flush cycle of the toilet. The illustrated system is an example of an existing conventional toilet retrofitted with the invention to simply illustrate principles of the invention, although the invention also can be implemented as original equipment with certain changes which will become apparent from the description to follow.

According to the invention, a sink bowl 16 is mounted above the toilet tank 14. The sink bowl is supported by a horizontal counter top 18 on a downwardly opening rigid fixture base 17 having a configuration matching that of the toilet tank. The top of the toilet tank is open to the underside of the counter top which retains the sink bowl. A drain opening 20 in the bottom of the sink leads directly into the open toilet tank. An upright drain pipe 21 sealed to the drain opening 20 in the base of the sink extends into the toilet tank. The sink provides a means for washing after the toilet is flushed, via a tubular water supply spout 22 mounted to the counter top adjacent the sink. The spout has an open discharge end spaced above and extending over the sink, so that water passing through the spout can be directed downwardly toward the sink. The spout can be part of any type of bathroom faucet assembly, but according to this invention, the spout does not include the usual bathroom faucet on/off valve for controlling the supply of water passing from the faucet through the spout and into the sink. The counter top is otherwise provided with an upright backsplash 24 which can extend along a wall behind the sink. The sink is therefore located in the same room as the toilet, preferably above the toilet tank as shown.

Fresh water under pressure from the domestic water supply passes from a standard cold water line 26 in the bathroom into the bottom of an upright filler tube 28 contained within the toilet tank 14. A conventional water supply and shutoff valve 30 is mounted to the top of the filler tube. The shutoff valve is controlled by any suitable water level sensing device such as a conventional float ball 32 at the end of a stem 34 which rotates upwardly as the level of water filling the tank increases. At the desired controlled volume of water within the tank, the float ball automatically closes the shutoff valve 30. During a subsequent flush cycle, the float ball and stem rotate downwardly as the water is drained from the toilet tank; the unit rotates upwardly as water fills the tank prior to the next flush cycle.

FIG. 1 also illustrates the usual handle 36 on the exterior of the toilet tank. The handle is rotated to pivot a trip lever 38 in the tank connected by a chain 40 or other tension line to a closure valve 42 that closes a pipe communicating between the bottom of the toilet tank and the toilet bowl. A conventional upright overflow tube 44 is shown adjacent the closure valve 42. This overflow tube is shown inasmuch as it is part of a conventional toilet tank plumbing system, normally used as a means of diverting the flow of water from the shutoff valve 30 through a conventional refill tube (not shown) leading to the top of the overflow tube. In the conventional manner this provides a means of baffling in the refilling of the tank through water passing from the refill tube into the overflow tube. However, in the present invention the toilet tank is not filled by water passing through such a refill tube and into the overflow tube 44.

The outlet from the shutoff valve is connected directly to a line 46 comprising a long, narrow-diameter tubular conduit extending away from the valve to supply domestic water to an inlet end 48 of the spout. When the valve 30 is automatically opened, domestic water under pressure preferentially flows under pressure directly through the line 46 for cycling the water through the spout, to the sink and then into the toilet tank. The line 46 is shown extending through the interior of the toilet tank toward the spout and connected to an intervening diverter valve 50 which can be optionally used in the system. The diverter valve is mounted to a front side of the fixture base 17 for easy access by the user. The diverter valve has a first connection 52 to an end of the line 46 inside the fixture base, and a second connection 54 also inside the fixture base which connects to a short upright line 56 extending from an outlet of the diverter valve to the bottom end connection 48 on the spout. The diverter valve further includes a third connection 58 inside the fixture base leading to a short bypass line 60 connected to the drain pipe 21 leading from the sink. The bypass line 60 preferably connects to a coupling 62 at the side of the drain pipe 21, between the drain 20 at the base of the sink and the bottom end of the pipe 21 inside the toilet tank. The diverter valve further includes an internal valve which is controlled by a handle 64 extending to the front outside face of the fixture base. The handle 64 on the diverter valve 50 can be manually adjusted to control the following water diversion options: (1) to allow water to pass from the line 46 directly into the spout 22 with no return water passing to the interior of the tank through the bypass line 60; (2) to completely cut off the flow of water to the spout if desired, in which case water is diverted through the bypass line 60 and to the pipe 21; or (3) to adjust flow of water through both the spout 22 and through the bypass line 60 simultaneously.

In an alternative form of the invention the system can be used without the diverter valve 50 and the bypass line 60, in which case all water passing from the outlet of the supply valve 30 passes through the line 46 and then passes directly through the spout to the sink 16 and into the drain 20 and drain pipe 21, filling the tank to the normal level. The flow from the supply valve 30 through the sink to the toilet tank is continuous and uninterrupted.

In using the invention, the water that is used for washing after the toilet is flushed is recycled into the toilet tank through the small sink that rests on top of the toilet tank. The line 46 that attaches to the shutoff valve that normally directs the water into the tank instead diverts the water to the spout located adjacent to the small sink. The water used to wash and rinse the hands flows into the sink directly from the diverter line and the spout and exits through the drain 20 located at the base of the sink. The large drain pipe 21 leads from the base of the sink directly into the toilet tank and controls the flow of water into the tank. As the tank water level rises, the float ball or other water level control device rises with it and automatically shuts off the valve 30 to stop the flow of incoming water at the appropriate level in the tank. This also turns off the water passing from the spout.

Thus, the volume of water cycled through the spout and the sink for washing is regulated to the amount used in one flush cycle of the toilet. It is preferred that the entire amount of water normally available during one flush cycle will be cycled directly from the shutoff valve 30 through the spout and to the sink and then recycled to the toilet tank, although as an option the diverter valve 50 can be used to make proportionate adjustments as desired. Although the drawing shows the bottom of pipe 21 leading toward the bottom of the toilet tank, other arrangements can be used to divert or otherwise baffle the flow of water discharged into the tank from the pipe 21. This can include directing the flow of water into the overflow tube. It is preferred that the drain pipe 21 from the base of the sink be larger in diameter than the diameter of the spout 22 so that water can pass from the sink into the toilet tank at a greater relative flow rate to ensure that water does not back up in the sink.

FIG. 2 illustrates an alternative embodiment in which water passing from the line 46' connected to the shutoff valve 30 is cycled through a heater element 66 prior to passing heated water through a return line 56' leading to the base 48 of the spout 22. In one embodiment the heater unit can be similar to the heater unit sold under the mark "Washlet" and manufactured by Toto, Ltd. of Japan. The heater unit can be mounted in a shelf assembly 68 to be mounted above the sink and used as a conventional bathroom shelf. The shelf can have a backsplash 70 integral with the fixture base 17, and the tubing 46', and 56' can be hidden behind the backsplash.

FIG. 3 shows an alternate form of the invention in which the heater unit 66 can be located within the fixture base 17. Water circulated through the heater passes directly to the spout for use in washing and then the recycled water passes from the sink into the toilet tank. Any cold water not circulated through the heater is diverted through the bypass line 60 and then to the tank.

As a further alternative, principally involving new construction where hot as well as cold water are brought to the toilet wall, the fixture base 17 can include a blender valve (not shown) manually controlled by a handle on the fixture base to adjust water temperature. Water from the blender valve passes to the water supply and shutoff valve 30 which can be coupled to a pipe located in the toilet tank. The water level sensing unit controls the outlet of the valve 30 in the usual manner. Water of a controlled temperature can pass from the valve 30 through the line 46 to the spout. If desired, the diverter valve 50 and bypass line can be used in this system arrangement.

What is claimed is:

1. A water saving toilet and bathroom fixture system comprising:
    a toilet bowl and a toilet tank integrally formed as a unit, the toilet tank having an interior containing a volume of water that enters the toilet bowl directly through a flush valve in the toilet tank opened by a flush mechanism on the toilet tank;

a fixture base separately mounted above the toilet tank;

a sink in the separately mounted fixture base and having a drain pipe leading from the base of the sink directly into the toilet tank;

a water supply spout mounted to the fixture base for directing the flow of water from the spout toward the sink;

a water supply and shutoff valve communicating with a supply pipe carrying domestic water under pressure to the interior of the toilet tank, the water supply and shutoff valve having an outlet for water supplied solely to the interior of the toilet tank and water level control means for closing the outlet from the shutoff valve when water in the toilet tank reaches a certain level;

a water diverting line coupled to the outlet of the water supply and shutoff valve and extending directly to an inlet end of the spout, the water diverting line being of narrow diameter less than the inside diameter of the water supply pipe, the flow of domestic water passing directly from the outlet of the shutoff valve through the water diverting line and to the spout in response to the shutoff valve being opened by the water level control means, so that the entire volume of water equal to one flush cycle of the toilet passes through the water diverting line, through the spout and down toward the sink for use in washing prior to the water passing from the base of the sink through the drain pipe and directly into the toilet tank in a continuous, uninterrupted flow, for use in filling the tank to said certain level for the next flush cycle which is vented to the adjacent toilet tank through the flush valve; and a diverter valve between the water diverting line and the spout, the diverter valve including means for directing at least a portion of the water from the water diverting line to the spout, means for directing at least a portion of the water from the water diverting lien to a bypass line inside the toilet tank, and control means on the exterior of the separately mounted base for manually controlling the flow of water either to the spout or to the bypass line.

2. Apparatus according to claim 1 in which the water from the water diverter line is cycled through a heater element for heating the water prior to the heated water being passed through the spout and then to the sink.

3. Apparatus according to claim 2 in which the heater element is contained within the fixture base that forms a top of the toilet tank.

4. Apparatus according to claim 2 in which the heater element is contained within a shelf structure for mounting above the toilet tank.

5. Apparatus according to claim 1 in which the sink is mounted to the fixture base which forms a top for the toilet tank.

6. A water saving toilet and bathroom fixture system comprising:

a toilet tank for containing a volume of water;

a fixture base mounted above the toilet tank;

a sink in the fixture base and having a drain pipe leading from the base of the sink directly into the toilet tank;

a water supply spout mounted to the fixture base for directing the flow of water from the spout toward the sink;

a water supply and shutoff valve communicating with a supply of domestic water under pressure inside the toilet tank, the water supply and shutoff valve having a water level control means for closing an outlet from the valve when water in the toilet tank reaches a certain level; and a water diverting line coupled to the outlet of the water supply and shutoff valve and extending to an inlet end of the spout, the flow of domestic water passing directly from the outlet of the valve through the water diverting line and to the spout in response to the valve being opened by the water level control means, so that water up to an amount equal to one flush cycle of the toilet can pass through the spout and down toward the sink for use in washing prior to the water passing from the base of the sink directly into the toilet tank for use in filling the tank to said certain level for the next flush cycle, including a diverter valve between the water diverting line and the spout, the diverter valve including means for directing at least a portion of the water from the water diverting line to the spout, means for directing at least a portion of the water from the water diverting line to a bypass line coupled to the drain pipe inside the toilet tank, and means for controlling the flow of water either to the spout or to the bypass line.

7. Apparatus according to claim 6 in which the diverter valve is mounted in the fixture base that forms a top of the toilet tank.

8. Apparatus according to claim 6 in which the toilet tank has an exterior side opposite the water contained in the tank, and in which the means for controlling the flow of water to the spout or the bypass line is on the exterior of the toilet tank.

* * * * *